Figure 1:
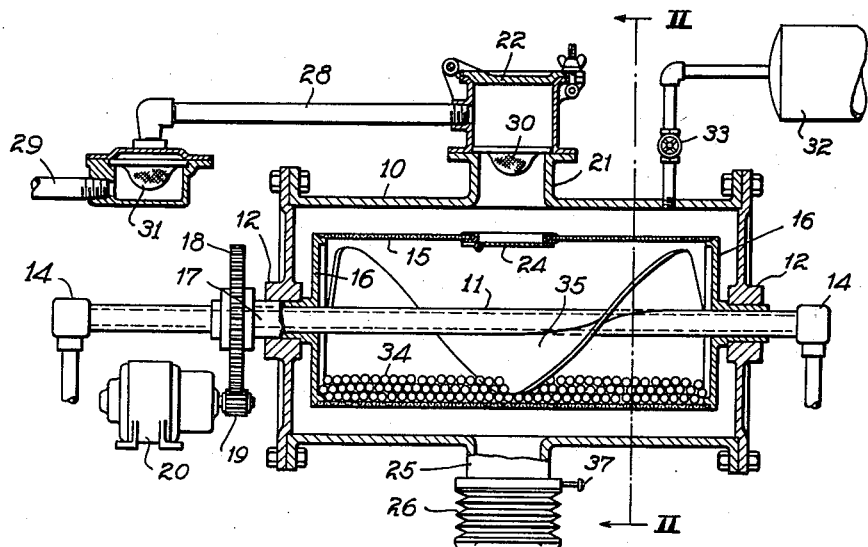

Feb. 10, 1942. F. C. ARTHUR 2,272,629
METALLIC PIGMENT
Filed Nov. 3, 1939

INVENTOR
Furman C. Arthur
BY
S. Ernest Low
ATTORNEY

Patented Feb. 10, 1942

2,272,629

UNITED STATES PATENT OFFICE 2,272,629

METALLIC PIGMENT

Furman C. Arthur, Oakmont, Pa., assignor to Aluminum Company of America, Pittsburgh, Pa., a corporation of Pennsylvania Application November 3, 1939, Serial No. 302,682

7 Claims. (Cl. 106—290)

This invention relates in general to the production of metallic pigments, and more particularly to the production of metallic pigments in powder form, as distinguished from metallic paste pigments.

Metallic pigments made from aluminum and other metals are commercially available in dry form and in paste form, and have been produced by a number of commercially acceptable methods. In general, such metallic pigments are produced by what is commonly termed a dry stamping process, wherein small particles of metal are subjected to disintegration under the influence of suitable stamping instrumentalities, such as hammers, impact bodies or the like, in substantially dry condition, although a small amount of a suitable lubricant or leaf-producing agent may be present during the dry stamping operation.

In a more recently developed process, metallic pigments have been produced in paste form by means of a ball milling process. In this latter process, metal particles are charged into a suitable ball mill in the presence of lubricating and leafing agent or agents, and mineral spirits, or other suitable volatile liquids, which volatile liquids are supplied in sufficient quantities to produce and maintain a metal sludge in a fluid condition during all stages of disintegration of the metal particles by the grinding action of the balls in the ball mill. Upon completion of the ball milling operation, as preferably measured by the degree of fineness of the metallic pigment desired, the sludge is removed from the ball mill and the excess liquid is usually removed from the sludge to adjust the metal content of the same to provide a homogeneous metallic paste pigment suitable for subsequent admixture with a vehicle in the manufacture of metallic paints, inks, and the like. Furthermore, a metallic pigment in dry powder form may also be produced from the paste product described hereinabove by evaporation of the solvent or volatile portion of the ball mill charge, and it is to this end that my present invention is directed.

I have discovered that a superior metallic pigment in dry powder form may be made from metallic paste pigments by the introduction of certain steps in the furtherance of the paste pigment process now generally and commercially accepted by the art. By the process of the paste pigment art now generally accepted is meant the paste process aforedescribed which is covered by United States Letters Patent to Everett J. Hall No. 2,002,891, dated May 28, 1935.

Metallic pigments in dry powder form as produced by the evaporation of the solvent portion of the sludge, or filter cake, of the metallic paste pigments produced in accordance with the process of United States Patent 2,002,891 are characterized by the inclusion of agglomerates and are known to have inferior covering power, although such powder may be entirely satisfactory from the standpoint of its ability to leaf.

It is an object of my invention to produce a metallic pigment in dry powder form which is characterized by substantial freedom from agglomerates, has maximum covering power, and is effective in its power to leaf on subsequent use as a metallic pigment for paints, inks, and the like.

It is a further object of my invention to provide an economical method for eliminating the agglomerates present in metallic pigments as heretofore produced.

Another object of my invention is to provide a continuous method for the production of a dry metallic pigment free from agglomerates and characterized by high covering and leafing powers.

A further object is to provide equipment for carrying out the method of my invention.

Figure 2:
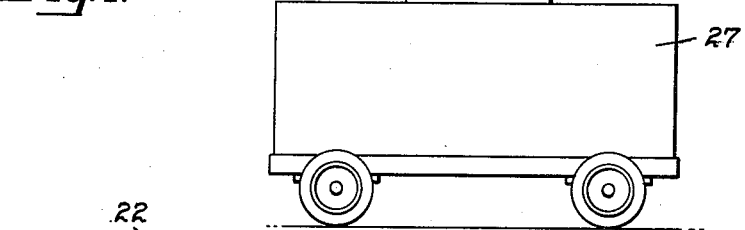
Figure 2:
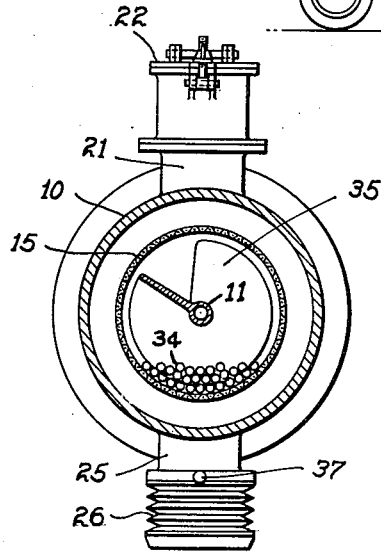

Other objects will present themselves on consideration of the following specification when read in conjunction with the drawing, forming a part of th s application, in which:

Fig. 1 illustrates a longitudinal, sectional elevation through a mechanism suitable for the practice of my invention; and Fig. 2 illustrates a cross-sectional view taken along the line II—II of Fig. 1.

In the preferred embodiment of the instant invention, the metallic sludge product of a previous ball milling operation, described hereinabove, as well as in United States Patent 2,002,891, is preferably charged into a suitable filter press to remove excess liquid or solvent. The filter cake is thereafter charged into the apparatus of the present invention for further treatment in accordance with the practice of my invention.

In its essence, the preferred method of the present invention comprises the steps of subjecting a sludge or filter cake of metallic flakes, volatile solvent, and a leafing agent to the action of impact burnishing bodies while simultaneously driving off the volatile liquid portion of the sludge or filter cake, the burnishing step being continued for a period of time following substantially complete elimination of the volatile l'quid to insure the elimination of agglomerates and to improve the covering power of the dry pigment thus produced. Vacuum drying of the sludge or filter cake is preferred, although other satisfactory drying methods may be employed. The process is entirely continuous in a single apparatus, which overcomes any necessity of transferring material from one mechanism to another.

The apparatus or mechanism of this invention comprises a drum 10 which is preferably cylindrical in shape and provided with a central tubular or hollow shaft 11 which serves as a conduit for steam, or other suitable heating medium, employed to raise the temperature of the contents within the drum. In the apparatus disclosed herewith, the shaft 11 is supported in bearings 12 formed integral with the ends of drum 10, connections 14 at the ends of the hollow shaft serving to provide communication with a closed system incorporating a suitable heat-producing unit not shown. It will be manifest that other satisfactory means may be employed for heating the drum 10, such as a steam jacket enclosing the same.

The drum 10 and shaft 11 are preferably stationary with respect to each other, and shaft 11 rotatably supports a perforated, or otherwise foraminous cage or shell 15 within the drum 10. The cage 15 is illustrated as having closed or solid end members or plates 16, a sleeve 17 secured to one of the end plates and extending through an end bearing of drum 10 being provided with a gear 18 in mesh with a pinion 19 mounted on the shaft of a suitable motor 20. The motor 20 preferably incorporates speed-reducing mechanism.

The drum 10 is constructed with a nozzle 21 and inlet door 22 on its upper or top surface. Also a charging door 24 is provided in the foraminous cage 15. The door 24 is disposed in longitudinal registry with the door 22 and preferably swings inwardly against suitable spring tension which normally holds the door in a closed position. Suitable well-known interlocking mechanism may be provided for insuring arcuate registration of doors 22 and 24 during cessation of rotation of the interior cage 15.

A discharge nozzle 25 is provided on the bottom surface of drum 10, a flexible hose connection or stocking 26 providing means for directing material discharged from nozzle 25 into a suitable material collecting buggy 27.

Since the invention normally contemplates the operation of the aforedescribed mechanism under vacuum, conduits 28 and 29, in direct communication with drum 10 and a suitable vacuum pump not shown, are provided, suitable filter bags 30 and 31 being installed in the vacuum line to insure against withdrawal of material from the drum 10 under the influence of the vacuum impressed thereon.

Also a source of inert gas pressure is provided in communication with the interior of drum 10 in the form of a reservoir 32 and valve connection 33.

In the practice of my invention, metallic pigment filter cake, a typical example of which may be composed of 60 to 85 per cent metal flakes, the remainder substantially volatile thinner, and leaf producing agent or agents, is charged through doors 22 and 24 into the interior of cage 15. Cage 15 is also charged with a suitable number of impact burnishing bodies in the form of steel or non-ferrous balls 34 of equal or variegated diameters. I have also found that the balls may be replaced by pellets of aluminum and its alloys, or small particles of flat aluminum sheet, particularly where the filter cake or sludge under treatment is aluminum paste pigment.

The motor 20 is thereafter actuated to rotate the cage 15 with its included charge of filter cake and impact bodies, thorough mixing of the charge being accomplished through the rotation of the cage relative to a stationary spiral vane 35 fixed to the stationary fixed central shaft 11.

Steam or other heating medium may be conducted through the hollow shaft 11 during the operation of the mechanism whereby the sludge or filter cake is brought to a temperature sufficient to volatilize the solvent portion of the filter cake. Also the interior of the apparatus is subjected to the influence of the aforedescribed vacuum which draws off the volatilized solvent to produce a dry metallic powder pigment.

The aforedescribed treatment of the filter cake, by vacuumized drying in the presence of impact burnishing bodies, produces a dry metallic pigment. However, the pigment in this form is not an entirely satisfactory commercial pigment since it is characterized by the presence of agglomerates and registers a low degree of covering power. I have found that by continuing the impact burnishing operation on the dry powder within the cage 15, the agglomerates may be eliminated, and improved covering power imparted to the dry pigment. In this connection, the perforations in the shell of cage 15 serve to classify the product and insure the production of a uniform product of desired and consistent fineness.

Following the volatilization of the liquid portion of the sludge or filter cake, which is preferably carried out at a temperature between about 200 and 215° F., it has been found that it is preferable to substitute water, or other cooling media, for the heating medium through the central tubular shaft 11 to lower the temperature of the dry powder pigment within the apparatus of the invention. In the case of a steam-jacketed drum 10, water may be substituted for the steam within the jacketed portion of the drum. This step is preferably carried out without interruption in the rotary movement of the cage 15, the continuance of impact burnishing being carried out under vacuum at a considerably lower temperature than the aforementioned drying step. This latter burnishing, at a lower temperature and under vacuum, imparts the final characteristics to the product of this invention, namely, the elimination of agglomerates and the superior covering power.

When the dry powder pigment has substantially reached room temperature, a quantity of inert gas, such as carbon dioxide, from the tank 32 is conducted into the apparatus through the valve-controlled inlet 33. Under the influence of the inert gas pressure, which is preferably slightly above atmospheric pressure, the finished dry powder pigment is discharged through discharge orifice 25 to receiving buggy 27. Valve 37 in association with discharge nozzle 25 serves to control the discharging operation. To assist in emptying the apparatus, cage 15 may be rotated.

Having thus described and explained the invention and its mode of operation, it is to be understood that the particular embodiments of the invention were selected merely for purposes of illustration and that variations in the form and arrangements of elements shown and described therein may be made without departing from the nature and scope of the invention except as defined in the claims appended hereto.

What is claimed is:

1. A method for producing metallic pigments in dry powder form having high covering power, the steps comprising subjecting a sludge of metallic powder and volatile liquid to a temperature sufficient to vaporize and drive off the volatile portion of the sludge, while simultaneously subjecting the sludge and dry metallic powder thus produced to the action of impact bodies to substantially eliminate agglomerates and burnish the dry metallic powder.

2. A method of producing dry metallic pigment powder having high covering power, the steps comprising subjecting a sludge of metallic powder, leafing agent, and volatile liquid to a temperature sufficient to drive off the volatile liquid portion of the sludge to produce a dry metallic leafing pigment, while simultaneously subjecting the sludge and dry pigment to the action of impact bodies to eliminate agglomerates and burnish the dry pigment.

3. The process of manufacturing a dry powder aluminum pigment having improved covering power, the steps comprising subjecting a sludge comprised of metallic aluminum powder, leafing agent, and volatile liquid to a temperature sufficient to remove the volatile liquid portion of the sludge, and simultaneously subjecting the sludge and produced dry pigment to the continuous action of impact bodies to eliminate agglomerates and burnish the dry pigment.

4. An apparatus for use in the manufacture of metallic pigment comprising a stationary chamber, a foraminous cage rotatably supported within said chamber upon a stationary tubular shaft, said tubular shaft serving as a conduit for supplying heat to said chamber, a helical vane secured to said tubular shaft within the foraminous cage, a plurality of impact bodies within said foraminous cage, and means for imparting rotary motion to said foraminous cage whereby the same is rotated relative to said chamber, vane, and impact bodies.

5. An apparatus for use in the manufacture of metallic pigment comprising a stationary chamber, a foraminous cage rotatably supported within said chamber upon a stationary tubular shaft, said tubular shaft serving as a conduit for supplying heat to said chamber, a helical vane secured to said tubular shaft within the foraminous cage, a plurality of impact bodies within said foraminous cage, a vacuum line connected to said stationary chamber, and means for imparting rotary motion to said foraminous cage whereby the same is rotated relative to said chamber, vane, and impact bodies.

6. The process of producing dry metallic pigment comprising, subjecting a sludge of metallic powder, leafing agent, and a volatile liquid to a temperature between about 200 and 215° F. to drive off the volatile liquid portion of the sludge and to produce a dry leafing pigment, cooling the dry leafing powder thus produced to substantially room temperature, while at all times during the process simultaneously subjecting the sludge and dry leafing powder to the action of impact bodies to eliminate agglomerates and burnish the dry pigment.

7. A process for producing metallic pigments in dry powder form having high covering power, the steps comprising subjecting a sludge of metallic powder, leafing agent and volatile liquid to a temperature sufficient to vaporize and drive off the volatile liquid portion of the sludge, while simultaneously subjecting the sludge and dry pigment to the action of relatively movable burnishing bodies to eliminate agglomerates and burnish the dry pigment.

FURMAN C. ARTHUR.